(12) United States Patent
Hofbauer et al.

(10) Patent No.: US 7,043,398 B2
(45) Date of Patent: May 9, 2006

(54) METHOD FOR OPERATING A POSITION MEASURING DEVICE

(75) Inventors: Hermann Hofbauer, Trostberg (DE); Helmut Huber, Garching/Alz (DE); Erich Strasser, Trostberg (DE); Steffen Bielski, Garching/Alz (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/478,909

(22) PCT Filed: May 7, 2002

(86) PCT No.: PCT/EP02/04993

§ 371 (c)(1),
(2), (4) Date: May 21, 2004

(87) PCT Pub. No.: WO02/095513

PCT Pub. Date: Nov. 28, 2002

(65) Prior Publication Data

US 2004/0193624 A1 Sep. 30, 2004

(30) Foreign Application Priority Data

May 23, 2001 (DE) .............................. 101 25 533

(51) Int. Cl.
*G06F 19/00* (2006.01)

(52) U.S. Cl. ...................... 702/182; 324/535; 375/224; 375/220; 702/69; 702/79

(58) Field of Classification Search .................... None
See application file for complete search history.

(56) References Cited

U.S. PATENT DOCUMENTS

| | | | |
|---|---|---|---|
| 5,347,227 A * | 9/1994 | Bortolini | 327/144 |
| 5,687,103 A | 11/1997 | Hagl et al. | |
| 5,724,392 A * | 3/1998 | Klimek et al. | 375/257 |
| 5,812,835 A * | 9/1998 | Ruuskanen | 713/503 |
| 5,867,030 A * | 2/1999 | Sato | 324/617 |
| 5,878,281 A | 3/1999 | Itoh et al. | |
| 6,265,951 B1 * | 7/2001 | Kirshtein | 333/28 R |
| 6,282,593 B1 * | 8/2001 | Goodfellow | 710/300 |
| 6,320,502 B1 | 11/2001 | Hagl | |
| 6,608,574 B1 * | 8/2003 | Johnson | 341/116 |

(Continued)

FOREIGN PATENT DOCUMENTS

DE  36 12 609 C2  3/1989

(Continued)

OTHER PUBLICATIONS

Internet Web page at www.heidenhain.com/highspeed.html entitled: "High-Speed Interface for Absolute Position Meauring Systems", date unkown.*

(Continued)

*Primary Examiner*—Patrick J. Assouad
(74) *Attorney, Agent, or Firm*—Brinks Hofer Gilson & Lione

(57) ABSTRACT

A system for determining a signal running time between a position measuring system and an evaluation unit. The system includes a position measuring system that has a graduation connected to a moving element, a scanning unit that scans the graduation, wherein scanning of the graduation generates signals representative of a position of the moving element and a transceiver means for generating serial data that is transmitted along a data line connected to the transceiver. The system further includes an evaluation unit connected to the data line, the evaluation unit having means for determining a signal running time between the position measuring system and the evaluation unit.

38 Claims, 3 Drawing Sheets

U.S. PATENT DOCUMENTS

| | | | |
|---|---|---|---|
| 6,646,454 B1 * | 11/2003 | Watkins | 324/674 |
| 6,771,076 B1 * | 8/2004 | Smith | 324/533 |
| 6,806,461 B1 * | 10/2004 | Strasser | 250/231.16 |
| 2003/0204355 A1 | 10/2003 | Mehnert et al. | |

FOREIGN PATENT DOCUMENTS

| | | |
|---|---|---|
| DE | 43 24 197 A1 | 2/1994 |
| DE | 43 42 377 A1 | 6/1995 |
| DE | 195 08 834 A1 | 9/1996 |
| DE | 197 11 216 C1 | 5/1998 |
| DE | 43 24 197 C2 | 7/1998 |
| DE | 197 24 716 A1 | 8/1998 |
| DE | 199 17 354 A1 | 10/2000 |
| DE | 199 33 491 A1 | 2/2001 |
| EP | 0 408 969 A2 | 1/1991 |
| EP | 0 660 209 A1 | 6/1995 |
| EP | 0 660 209 B1 | 10/1996 |

OTHER PUBLICATIONS

Steffen Bielski et al., Absolute Meβsysteme-Sicherheitserwartungen an die Datenerfassung und Datenübertragung, Messtechnik—mpa 1 / 2, 1996, pp. 6, 8, 9, 12, 14.

* cited by examiner

METHOD FOR OPERATING A POSITION MEASURING DEVICE

Applicants claim, under 35 U.S.C. §§ 120 and 365, the benefit of priority of the filing date of May 7, 2002 of a Patent Cooperation Treaty patent application, copy attached, Ser. No. PCT/EP02/04993, filed on the aforementioned date, the entire contents of which are incorporated herein by reference, wherein Patent Cooperation Treaty patent application Ser. No. PCT/EP02/04993 was not published under PCT Article 21(2) in English.

Applicants claim, under 35 U.S.C. § 119, the benefit of priority of the filing date of May 23, 2001 of a German patent application, copy attached, Ser. No. 101 25 533.0, filed on the aforementioned date, the entire contents of each of which are incorporated herein by reference.

BACKGROUND OF THE INVENTION

1. Field of the Invention

The present invention regards a method of operation of a position measuring device.

2. Description of the Related Art

A method for the serial transmission of position data from a position measuring system to a downstream-connected evaluation unit, or electronic follow-up device, is known from EP 660 209 B1 of Applicant. In this case the bidirectional data transmission on a data line is synchronized with the aid of a phase signal of a defined transmission phase frequency on a parallel phase line. Along with an increase in the transmission of position data and possibly other data in this way, the demands regarding the transmission speed, or the amount of data to be transmitted, also increase. If now, besides the transmission speed, in addition the transmission distance between the position measuring system and the evaluation unit also increases, the result in the end are significant signal running times of the data transmitted on the data line. It is necessary to take into account the resulting delay times for the correct further processing of the various data. The reason for this is that on the part of the evaluation unit it is always necessary to provide a definite assignment of the data bits transmitted on the data line to the phase edges of the phase signal in order to assure the correct further processing of the various data. Thus, without further steps, clear limitations result with respect to maximally permissible transmission paths, or cable lengths, and the maximally permissible transmission speed, or transmission phase frequency. The correlation of the maximally permissible transmission phase frequency $f_C$ and the cable length $L_K$ is illustrated in FIG. 3. The graphic representation approximately indicates that with cable lengths of 100 m only a maximally permissible transmission phase frequency $f_C$=500 kHz results.

SUMMARY AND OBJECTS OF THE INVENTION

It is therefore an object of the present invention to disclose a method for operating a position measuring system which makes it possible to transmit data in serial form between the position measuring system and a downstream-located evaluation unit at high transmission speeds even over large transmission distances.

This object is attained by a method for operating a position measuring system, downstream of which an evaluation unit for further processing position data is arranged. The method includes requesting serial transmission of data by the evaluation unit from the position measuring system on a data line, which connects the evaluation unit and the position measuring system, wherein the data is transmitted in a direction toward the evaluation unit. Starting a counter at the evaluation unit at a definite starting time, which counts up at a predetermined counting frequency and determining an actual count of said counter at a certain time as soon as the data are detected by the evaluation unit. Determining a signal running time between the position measuring system and the evaluation unit from the determined actual count of the counter.

The above object is also attained by a system for determining a signal running time between a position measuring system and an evaluation unit. The system includes a position measuring system that has a graduation connected to a moving element, a scanning unit that scans the graduation, wherein scanning of the graduation generates signals representative of a position of the moving element and a transceiver means for generating serial data that is transmitted along a data line connected to the transceiver. The system further includes an evaluation unit connected to the data line, the evaluation unit having means for determining a signal running time between the position measuring system and the evaluation unit.

In accordance with the present invention, the specific signal running time for the specific configuration including the position measuring system, transmission path and evaluation unit is now determined prior to the actual measuring operation. The signal running time determined in this way is subsequently suitably employed in the further processing of the position data and possible further data. In this way it is assured that the correct synchronization between the binary data words transmitted on the data line and the clock edges of the clock signal on the clock line can now take place with the aid of the signal running time determined in accordance with the present invention. In the end it is possible in this way to assure that data can be dependably transmitted at high transmission speeds between the position measuring system and the evaluation unit even over extended transmission tracks. For example, it is now possible to transmit data at transmission clock frequencies of 4 MHz and more over cable lengths of up to 100 m which, in comparison with the prior art, represents an increase of the transmission clock frequency by a factor of 8.

The signal running time is preferably determined several times, so that it is assured that the signal running time is correctly determined, and that no erroneous value for this is determined because of possible temporary interferences on the data transmission line.

It has been shown to be particularly advantageous if the method of the present invention is basically executed following each change in the configuration of the position measuring system, data transmission path and evaluation unit, and/or following every interruption of the electric power supply to the position measuring system and/or the evaluation unit. In this case the determination of the signal running time takes place automatically.

Further advantages, as well as details of the present invention, ensue from the subsequent description of an exemplary embodiment by the attached drawings.

Shown are in:

BRIEF DESCRIPTION OF THE DRAWINGS

A schematic block circuit diagram is represented in FIG. 1, which illustrates the basic configuration of the system includes the position measuring system 10 and the downstream-connected evaluation unit 20, which are connected with each other by different signal lines 30.1, 30.2, 31.1, 31.2 along the transmission path. In actual use, the position measuring system 10 is arranged, for example, in a motor housing 40 and at the motor it detects position data regarding the relative and/or absolute positions of a moving object or element, such as the rotating motor rotor 110 (denoted by arrows). The photo-electrical scanning, via a scanning unit 100, of a measuring graduation 120 arranged on a rotating graduated disk 130, for example, can be used for this. As shown in FIG. 1, the scanning unit 100 and the rotor 110 are denoted schematically as dashed lines that define boxes. Similarly, the graduated disk 130 and the measuring graduation 120 are denoted by solid lines that define boxes. Note that the size and shape of the boxes used to denoted items 100, 110, 120 and 130 are solely being used for representational purposes and do not denote a particular shape, spatial orientation or structure for the items. Clock-shifted scanning signals in the form of incremental signals are generated in the course of this, which are further processed by the position measuring system 10 into absolute position data and, suitably processed, are transmitted in serial form as binary data words to the evaluation unit 20 via the lines 31.1, 31.2. As for the evaluation unit 20, or electronic follow-up device, this can be a customary motor control or motor regulation, which takes over the regulation of the motor on the basis of the transmitted data.

Figure 1:
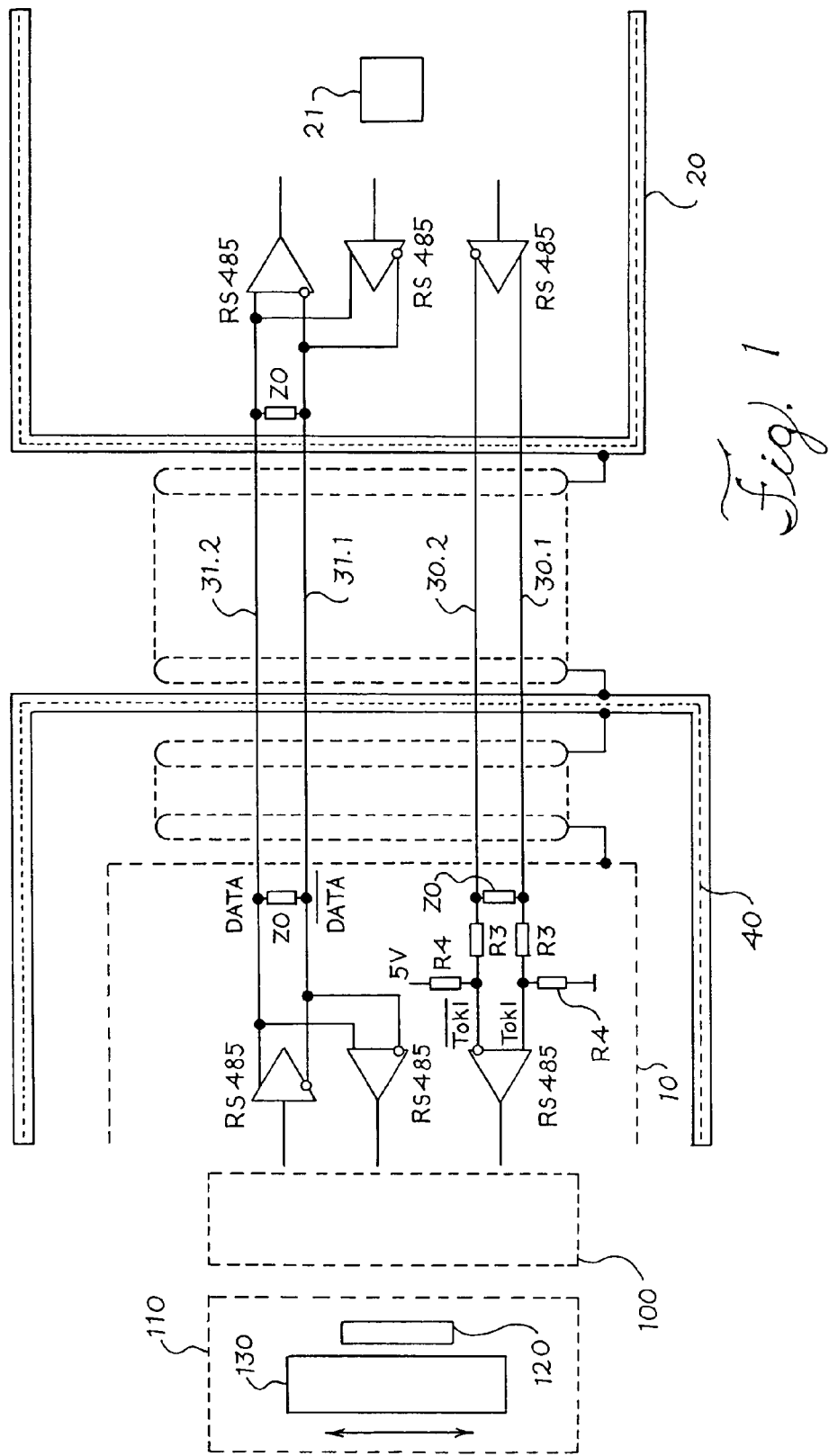
FIG. 1 shows a schematic block circuit diagram of an embodiment of a system including the position measuring system, transmission path and evaluation unit in accordance with the present invention.

Alternatively to such an application, the position measuring system can be employed in a machine tool, for example for determining the exact position of a tool relative to a workpiece to be processed, and for transmitting the respective position data for further processing to an evaluation unit embodied as a machine tool control. Linear measuring devices, angle encoders or angle measuring devices, for example, can be employed as position measuring systems.

Moreover, the present invention is of course not limited to the above mentioned type of the physical generation of the position data. Instead, it is also possible to operate position measuring systems based on different scanning principles.

In general, the manner of data transmission between the position measuring system 10 and the downstream-located evaluation unit corresponds to the known bidirectional, synchronously-serial data transmission in EP 660 209 B1, which is furthermore also known in the trade as the so-called EnDat® interface.

The data lines 31.1, 31.2, as well as the phase lines 30.1, 30.2, together with the transceiver modules required for data transmission, each of which is provided with the identification RS 485, are used for the actual data transmission. In the example represented, two data and phase lines 31.1, 31.2, 30.1, 30.2 each are provided, over which the phase signal and the data are transmitted in inverted form for security reasons. However, basically only one data line and one phase line would be required, therefore in what follows only a phase line and a data line are mentioned.

While the bidirectional serial transmission of the binary data words between the position measuring system and the evaluation unit takes place via the data lines 31.1, 31.2, a high-frequency clock signal is transmitted on the clock lines 30.1, 30.2 from the evaluation unit 20 in the direction toward the position measuring system 10 at a defined transmission clock frequency $f_C$, via which in the end the entire data transmission is synchronized in a known manner.

Since, as already explained at the outset, significant data running times for the data exchanged on the data lines 31.1, 31.2 result with long transmission distances, or cable lengths, and the simultaneously demanded high data transmission rates, in accordance with the present invention a defined signal running time $t_D$ of the data transmitted over the clock and data lines 30.1, 30.2, 31.1, 31.2 is now determined prior to the actual measuring operation. In the example explained in what follows, the signal running time $t_D$ corresponds to the time needed by the signals to be transmitted from the evaluation unit 20 to the position measuring system 10 and back again. This signal running time $t_D$ is specific for each defined configuration includes the position measuring system 10, transmission path and evaluation unit 20. Once the value of $t_D$ is dependably known for a defined configuration, it can be taken into consideration by the evaluation unit 20 in the further processing of the data received from the position measuring system 10.

The method for determining the signal running time $t_D$ in accordance with the present invention will be explained in what follows via an example in FIGS. 2a to 2c. The period of time prior to the actual measuring operation represented in the drawings here shows only a portion of the method of the present invention.

Figure 2:
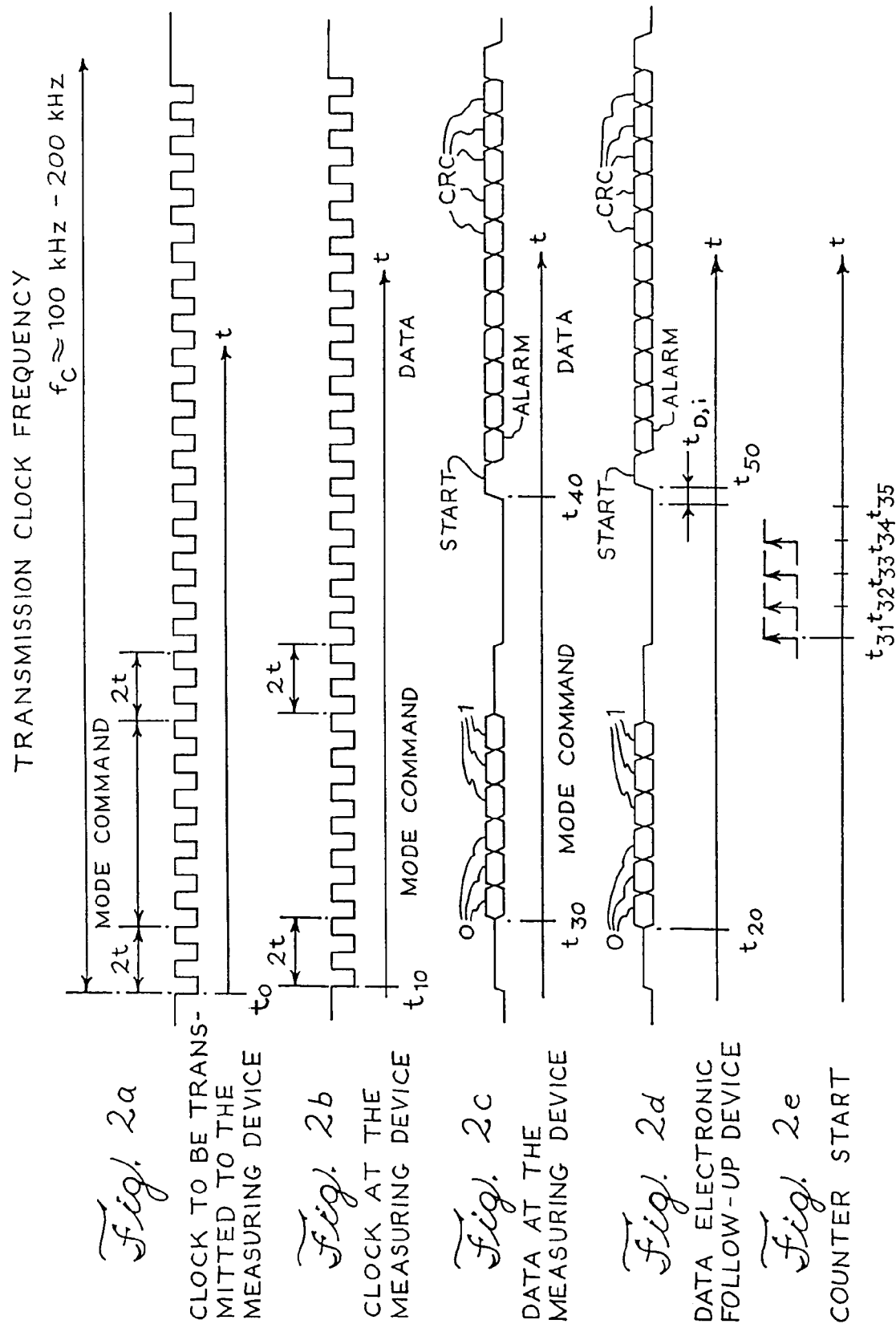
FIGS. 2a to 2e show signal diagrams for explaining an embodiment of a method in accordance with the present invention.
Figure 3:
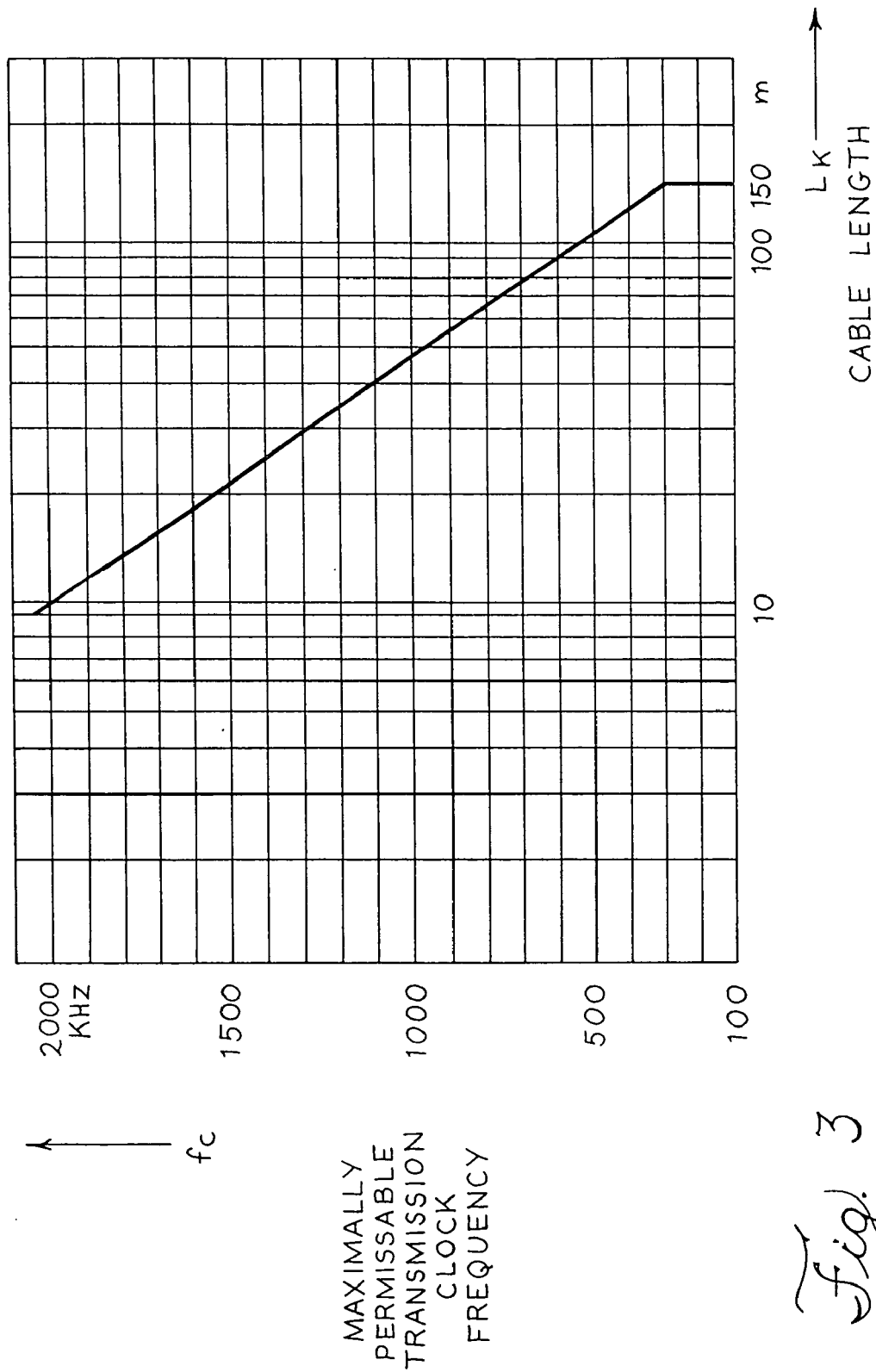
FIG. 3 shows the correlation between the maximally permissible transmission clock frequency $f_C$ and the cable length $L_K$.

The progression over time of the clock signal on the clock lines 30.1, 30.2 is represented in the two FIGS. 2a and 2b. FIG. 2a shows the progression over time of the clock signal transmitted from the evaluation unit to the position measuring system, or the measuring device, starting at the time $t_0$, while FIG. 2b shows the progression over time of the clock signal starting at the time $t_{10}$ at the position measuring system. As can be seen from FIGS. 2a and 2b, a defined chronological offset occurs between the two times $t_0$ and $t_{10}$, caused by the finite running time of the clock signal on the transmission path between the position measuring system and the evaluation unit.

It should further be noted regarding the clock signal by which the data transmission between the position measuring system and the evaluation unit is synchronized, that for executing the method in accordance with the present invention the respective transmission clock frequency $f_C$ is preferably selected on an order of magnitude $f_C \approx 100$ to $200$ kHz. Thus, the required transmission clock frequency $f_C$ for executing the method in accordance with the invention is selected to be clearly lower than the transmission clock frequency $f_C$ during the actual measuring operation, which can be approximately $f_C = 4$ MHz.

In principle it has been shown to be advantageous if the transmission clock frequency $f_C$ for executing the method in accordance with the present invention is selected to be such that the signal running time $t_D$ to be expected is less than a clock period t of a clock signal with the transmission clock frequency $f_C$ transmitted on the clock line:

$$t_D < 1/f_C = t \quad \text{(Equ. 1)}$$

In the following example it is assured that, while maintaining this requirement, the detection of the signal running time $t_D$ does actually take place correctly.

The signal progression over time on the phase line is represented in the two FIGS. 2c and 2d; here, FIG. 2c shows the signal progression at the position measuring system, while the signal progression at the evaluation unit, or electronic follow-up device, is shown in FIG. 2d. In this case, too, there is again a chronological offset between the data signals at the position measuring system and at the evaluation unit, again caused by the signal running times on the transmission path. For example, at the time $t_{20}$ a binary data word in the form of a 6 bit mode command is sent from the evaluation unit to the position measuring system which, however, only arrives there at the time $t_{30}$ because of the delay.

The transmission of data, for example position data, in the form of an appropriate binary data word is now requested by the evaluation unit by via the transmitted mode command. After the appropriate data have been processed for serial transmission, the position measuring system starts with the transmission of the data in the form of a binary data word at the time $t_{40}$. Because of the resulting signal running time over the transmission path, the respective data word arrives at the evaluation unit only at the time $t_{50}$.

Now the time between the time $t_{50}$ and the last rising phase edge of the phase signal on the phase line is defined as the signal running time $t_{D,i}$ caused by the transmission path. In the present example, a corresponding rising phase edge existed at the evaluation unit for the last time prior to detecting the start bit at the time $t_{35}$.

For determining the running time $t_{D,i}$, a counter is started for the first time at the evaluation unit, such as is illustrated in FIG. 2e; in the block circuit diagram in FIG. 1, the counter is identified schematically by the reference number 21. The counter counts upward at a preset counting frequency $f_Z$, wherein the selected counting frequency $f_Z$ has been selected to be clearly greater than the transmission phase frequency $f_C$ of the phase signal on the phase line used during the measuring operation. In this case the counting frequency $f_Z$ is preferably selected to be at least eight times as great as the transmission phase frequency $f_C$ used during measuring operations, i.e.

$$f_Z > 8 * f_C \quad \text{(Equ. 2)}$$

If, for example, a transmission phase frequency $f_C = 4$ MHz is intended for the measuring operation, the counting frequency $f_Z = 32$ MHz is selected.

To assure a sufficiently exact and interference-proof determination of the signal running time $t_D$, the selected counting frequency $f_Z$ may maximally vary by +/−10%. Accordingly, in the above example with $f_Z = 32$ MHz, a maximum frequency variation of +/−3.2 MHz could be tolerated.

Now the counter, which was first started at the time $t_{31}$ with a rising switching edge of the phase signal on the phase line, counts up until it is either started again by a new rising switching edge of the phase signal, or the actual count Z of the counter is detected, or stored, by the rising phase edge of the arriving start bit of the transmitted data word. Accordingly, in the example represented, the counter in FIG. 2e is started again at the times $t_{31}$ to $t_{35}$ by the rising switching edge of the phase signal; at the time $t_{50}$, the actual count Z of the counter is detected and stored because of the rising phase edge of the arriving start bit of the data word transmitted by the position measuring system.

Thereafter, the signal running time $t_{D,i}$ can be determined by the evaluation unit from the known counting frequency $f_Z$ and the detected count of the counter, i.e. $t_{D,i} = Z * 1/f_Z$.

The signal running time $t_{D,i}(i=2)$ is preferably determined at least one more time in this way, and an average signal running time $t_D$ is determined from the individual signal running times $t_{D,1}, t_{D,2}$. In the present example of the method of the invention, the signal running time $t_{D,i}(i=1, 2, 3)$ is determined a total of three times in the explained way, and subsequently the average signal running time $t_D$ is determined as the arithmetic mean of the individual signal running times $t_{D,i}$, i.e.

$$t_D = (t_{D,1}, t_{D,2}, t_{D,3})/3 \quad \text{(Equ. 3)}$$

The repeated determination of the signal running times $t_{D,i}$ assures that possible errors in their determination and a consistency check of the detected individual values $t_{D,i}$ can be removed. Within the scope of the present invention it is of course also possible to determine more than three individual values $t_{D,i}$ and to derive therefrom an average signal running time $t_D$ by forming the arithmetic mean.

Further embodiment variations of the method in accordance with the present invention of course exist besides the explained example.

It has been proven to be advantageous if, following the determination of the mean from the individual signal running times $t_{D,i}$, a further check is made by what amount $\Delta t_{D,i}$ the individual signal running times $t_{D,i}$ deviate from the average signal running time $t_D$. For example, it is possible to predetermine that the maximally permissible deviation $\Delta t_{D,i}$ of a single determined signal running time $t_{D,i}$ from the mean $t_D$ is allowed to be maximally ⅛ of the phase length T of the transmission phase frequency $f_C$ during measuring operations, i.e.

$$\Delta t_{D,i} < (\tfrac{1}{8}) * (1/f_C) \quad \text{(Equ. 4)}$$

In case of an impermissible greater deviation, an error message would be issued by the evaluation unit, and the determination of the signal running times $t_{D,i}$ would be repeated, etc.

After the signal running time $t_D$ has been determined in this way, this value can be taken into consideration during the following processing by the evaluation unit of the data received from the position measuring system.

Finally, a further embodiment of the serial data transmission between the position measuring system and the downstream-located evaluation unit will be explained. This process was shown to be advantageous in particular with long transmission paths and the signal running times resulting therefrom, if the signal running time $t_D$ had previously been determined in a manner in accordance with the invention.

Thus, during measuring operations it is provided here in the course of each request for data from the position measuring system to initially see to it that the position measuring system no longer transmits data in the direction toward the evaluation unit. It is intended in this way to prevent an otherwise possible collision on the data line. To this end, in case of a data request first a delay signal at the logical LOW level, which has a defined preset length of time $t_{ST}$ is transmitted on the data line from the evaluation unit to the position measuring system. The actual phase signal of the respective transmission phase frequency $f_C$ is transmitted and the data transmission is performed in the usual manner only after this length of time $t_{ST}$. Accordingly, the first period of the transmitted phase signal is composed of the transmission of the delay signal with the logical LOW level and the length $t_{ST}$ and a subsequent logical HIGH level of the transmission phase length t/2. The length $t_{ST}$ of the delay signal is selected to be, for example, $t_{ST}=1.5$ µs.

Further embodiment variations of the method in accordance with the invention of course exist besides the explained example.

We claim:

1. A method for operating a position measuring system, downstream of which an evaluation unit for further processing position data is arranged, the method comprising:
    requesting serial transmission of data by said evaluation unit from said position measuring system on a data line, which connects said evaluation unit and said position measuring system, wherein said data is transmitted in a direction toward said evaluation unit;
    starting a counter at said evaluation unit at a definite starting time, which counts up at a predetermined counting frequency;
    determining an actual count of said counter at a certain time as soon as said data are detected by said evaluation unit; and
    determining a signal running time between said position measuring system and said evaluation unit from said determined actual count of said counter.

2. The method in accordance with claim 1, further comprising:
    determining at least one additional signal running time; and
    determining an average signal running time from said signal running time and said at least one additional signal running time.

3. The method in accordance with claim 1, wherein said determining said signal running time takes place prior to a measuring operation performed by said position measuring system.

4. The method in accordance with claim 3, wherein said predetermined counting frequency is selected to be clearly higher than a transmission clock frequency, used in said measuring operation, of a clock signal on a clock line connected to said evaluation unit and said position measuring system, by which said serial transmission of said data on said data line is clocked.

5. The method in accordance with claim 4, wherein said predetermined counting frequency is at least eight times greater than said transmission clock frequency used in said measuring operation.

6. The method in accordance with claim 4, wherein said predetermined counting frequency has a maximal frequency variation of +/−10%.

7. The method in accordance with claim 1, wherein said counter is restarted by a switching edge of a clock signal on a clock line, which is connected to said evaluation unit and said position measuring system, over which said serial transmission of said data on said data line is clocked.

8. The method in accordance with claim 7, wherein said switching edge is a rising switching edge.

9. The method in accordance with claim 2, wherein said at least one additional signal running time are two additional signal running times, and thereafter said average signal running time is determined as an arithmetic mean from said signal running time and said two additional signal running times.

10. The method in accordance with claim 2, further comprising:
    subsequent to said determining said average signal running time, checking deviations of said signal running time and said at least one additional signal running time from said average signal running; and
    issuing an error message in case of an impermissibly large deviation.

11. The method in accordance with claim 1, wherein position data in the form of binary data words are transmitted as said data for determining said signal running time, and said actual count of said counter is detected as soon as a rising or falling edge of a start bit of one of said binary data words is detected by said evaluation unit.

12. The method in accordance with claim 4, wherein in the course of said determining said signal running time said transmission clock frequency on said clock line is selected to be clearly lower than said transmission clock frequency on said clock line during said measuring operation of said position measuring system.

13. The method in accordance with claim 12, wherein said transmission clock frequency on said clock line during said determining said signal running time is selected to lie between 100 and 200 kHz.

14. The method in accordance with claim 12, wherein said transmission clock frequency on said clock line during said determining said signal running time is selected in accordance with the following condition:

$t_D 1/f_C$, wherein $t_D$=signal running time and $f_C$=transmission clock frequency.

15. The method in accordance with claim 1, wherein said determining said signal running time is performed following every change of the configuration of a system defined by said position measuring system, a path of transmission of said data and said evaluation unit.

16. The method in accordance with claim 15, wherein said determining said signal running time following every change of configuration takes place automatically.

17. The method in accordance with claim 1, wherein said determining of said signal running time is performed following any interruption of a supply of electric power to said position measuring system and/or said evaluation unit.

18. The method in accordance with claim 17, wherein said determining said signal running time following any interruption of a supply of electric power takes place automatically.

19. The method in accordance with claim 3, further comprising transmitting, during said measuring operation and in case of a data request, a delay signal of a logical LOW level of a defined length of time from said evaluation unit to said position measuring system.

20. The method in accordance with claim 1, wherein said determined value of said signal running time is taken into consideration during processing of said data received by said evaluation unit from said position measuring system.

21. A system for determining a signal running time between a position measuring system and an evaluation unit comprising:
    a position measuring system comprising:
        a graduation connected to a moving element;
        a scanning unit that scans said graduation, wherein scanning of said graduation generates signals representative of a position of said moving element; and
        a transceiver means for generating serial data that is transmitted along a data line connected to said transceiver; and
    an evaluation unit connected to said data line, said evaluation unit comprising means for determining a signal running time between said position measuring system and said evaluation unit.

22. The system for determining a signal running time in accordance with claim 21, wherein said means for determining a signal running time comprises a counter which counts up at a predetermined counting frequency.

23. The system for determining a signal running time in accordance with claim 21, further comprising means for determining an average signal running time from said signal running time and at least one additional signal running time.

24. The system for determining a signal running time in accordance with claim 21, further comprising a clock line connected to said position measuring system and said evaluation unit.

25. The system for determining a signal running time in accordance with claim 22, further comprising a clock line connected to said position measuring system and said evaluation unit.

26. The system for determining a signal running time in accordance with claim 24, wherein said counter is restarted by a switching edge of a clock signal on said clock line.

27. The system for determining a signal running time in accordance with claim 26, wherein said switching edge is a rising switching edge.

28. The system for determining a signal running time in accordance with claim 23, further comprising:
    means for determining deviation of a signal running from said average signal running; and
    means for issuing an error message in case of an impermissibly large deviation.

29. The system for determining a signal running time in accordance with claim 21, wherein said moving element is a rotor of a motor and said graduation comprises a rotating graduation disk that is coupled to said rotor.

30. A method for determining a signal running time between a position measuring system and an evaluation unit, said position measuring system and said evaluation unit being connected by a data line and a clock line, the method comprising:
    requesting serial transmission of data from said position measuring system by said evaluation unit, wherein said requesting is associated with a defined edge of a clock signal transmitted on said clock line from said evaluation unit to said position measuring system;
    transmitting said requested data in the form of at least one binary data word from said position measuring system to said evaluation unit, wherein said at least one binary data word is transmitted on said data line; and
    determining a signal running time from a time difference between said defined edge of said transmitted clock signal on said clock line and an edge of a signal on said data line indicating arrival of said at least one binary data word transmitted to said evaluation unit.

31. The method in accordance with claim 30, wherein said time difference is determined with a counter which counts up at a predetermined counting frequency.

32. The method in accordance with claim 31, further comprising:
    starting said counter with a defined edge of said clock signal on said clock line; and
    stopping said counter with a defined edge of a signal on said data line.

33. The method in accordance with claim 30, wherein said determining said signal running time takes place prior to a measuring operation performed by said position measuring system.

34. A system for determining a signal running time between a position measuring system and an evaluation unit comprising:
    a position measuring system comprising:
        a graduation connected to a moving element;
        a scanning unit that scans said graduation, wherein scanning of said graduation generates signals representative of a position of said moving element; and
        a first transceiver means for generating serial data that is transmitted along a data line connected to said first transceiver;
        a second transceiver means for generating a clock signal that is transmitted along a clock line connected to said second transceiver and
    an evaluation unit connected to said data line and said clock line, said evaluation unit comprising means for determining a signal running time between said position measuring system and said evaluation unit based on a time difference between a defined edge of a clock signal transmitted on said clock line and an edge of a signal on said data line indicating arrival of at least one binary data word transmitted to said evaluation unit.

35. The system for determining a signal running time in accordance with claim 34, wherein said means for determining a signal running time comprises a counter which counts up at a predetermined counting frequency.

36. The system for determining a signal running time in accordance with claim 35, wherein said counter is started with said defined edge of said clock signal on said clock line and is stopped with a defined edge of said signal on said data line.

37. The system for determining a signal running time in accordance with claim 34, wherein said determining said signal running time takes place prior to a measuring operation performed by said position measuring system.

38. The system for determining a signal running time in accordance with claim 34, wherein said moving element is a rotor of a motor and said graduation comprises a rotating graduation disk that is coupled to said rotor.

* * * * *